United States Patent [19]

Armato

[11] Patent Number: 5,363,632
[45] Date of Patent: Nov. 15, 1994

[54] EQUINE ATHLETIC BOOT WITH INFLATABLE U-SHAPED BLADDER

[75] Inventor: Peter J. Armato, Mt. Sterling, Ky.

[73] Assignee: Equine Textiles, Inc., Mt. Sterling, Ky.

[21] Appl. No.: 106,464

[22] Filed: Aug. 13, 1993

[51] Int. Cl.⁵ .......................... A61D 9/00; B68C 5/00
[52] U.S. Cl. ........................................ 54/82; 602/13
[58] Field of Search .............. 54/82; 168/18; 602/13, 602/63

[56] References Cited

U.S. PATENT DOCUMENTS

| | | | |
|---|---|---|---|
| 581,042 | 4/1897 | Sites | 54/82 |
| 809,276 | 1/1906 | Aulton | 54/82 X |
| 2,937,487 | 5/1960 | Dever | 54/82 |
| 3,193,984 | 7/1965 | Schubert | 54/82 |
| 4,538,602 | 9/1985 | Shapiro . | |
| 5,115,627 | 5/1992 | Scott | 54/82 |

FOREIGN PATENT DOCUMENTS

| | | |
|---|---|---|
| 8907915 | 9/1989 | Australia . |
| 7714 | of 1899 | United Kingdom . |
| 2241632 | 9/1991 | United Kingdom ............ 54/82 |

OTHER PUBLICATIONS

Royal Riders, Royal Riders Air Boot, No Publication Date Specified, pp. 1-2.

*Primary Examiner*—Robert P. Swiatek
*Attorney, Agent, or Firm*—King and Schickli

[57] ABSTRACT

An equine athletic boot includes a panel of shock absorbing material that is wrapped around the lower leg of a horse above and below the fetlock. The panel is shaped in such a way that when so wrapped, the lower end of the boot is higher on the front side of the leg to allow full forward extension of the pastern, and slants down and below the fetlock for full protection thereof. Carried by the panel is an inflatable U-shaped tubular bladder. When the boot is properly positioned on the leg, the two vertical portions of the bladder align with the indentations formed between the flexor tendons and canon bone. When inflated, the bladder fills the forementioned indentations resulting in substantially uniform pressure around the full circumference of the leg. In addition, the closed end of the U-shaped bladder is disposed underneath the fetlock providing support and protection of the seismoid bones.

19 Claims, 2 Drawing Sheets

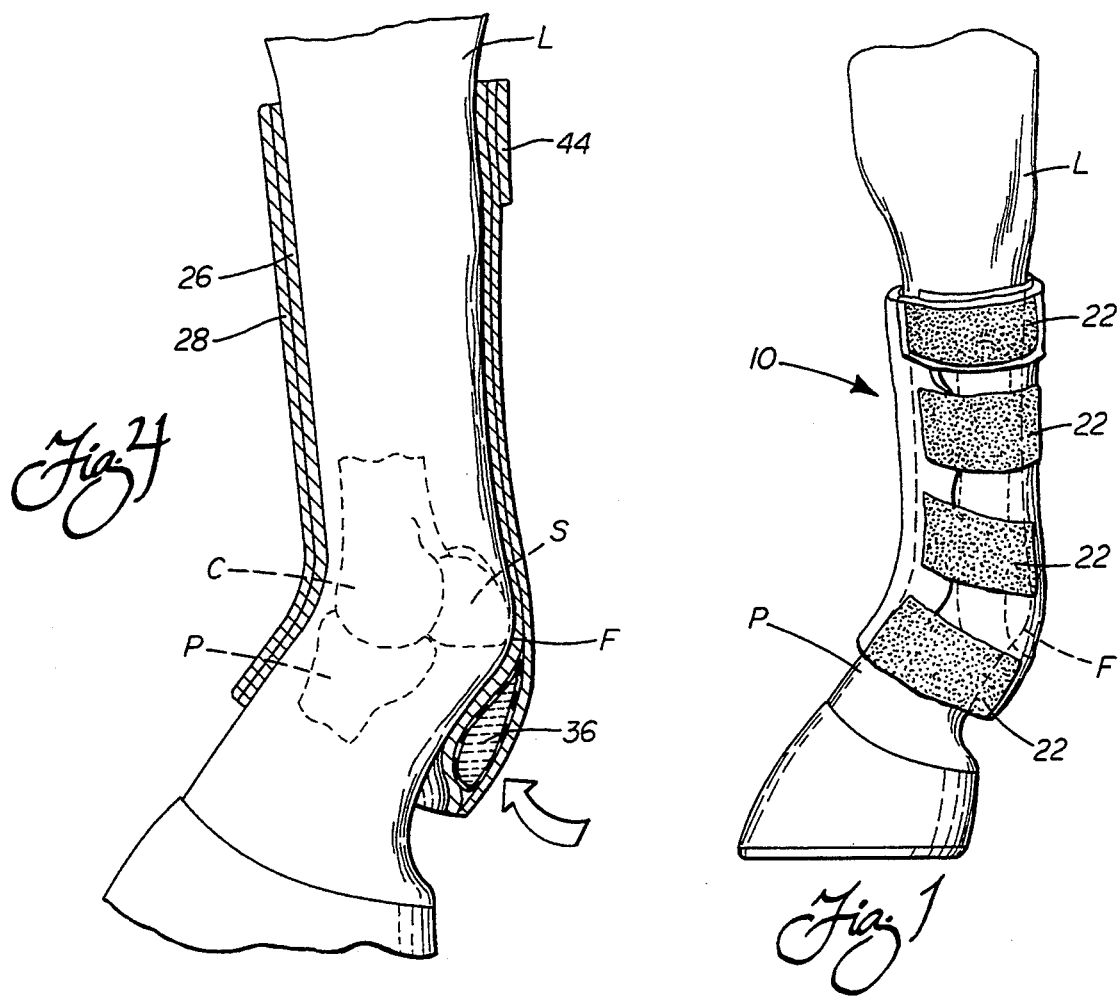
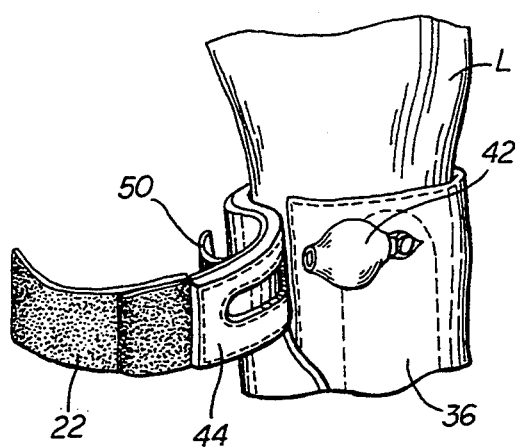
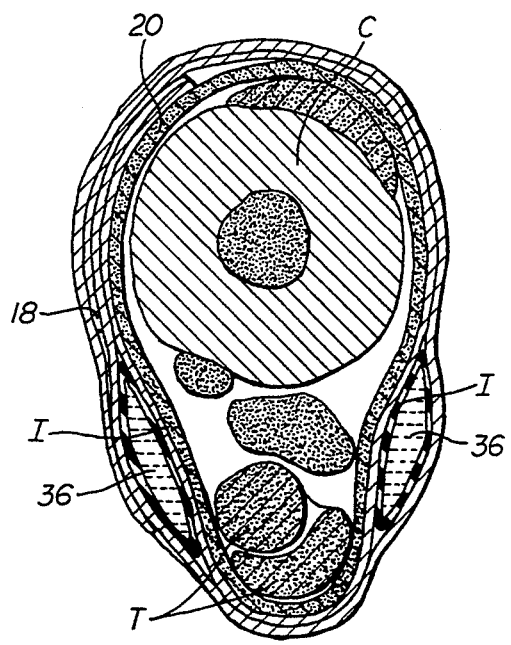

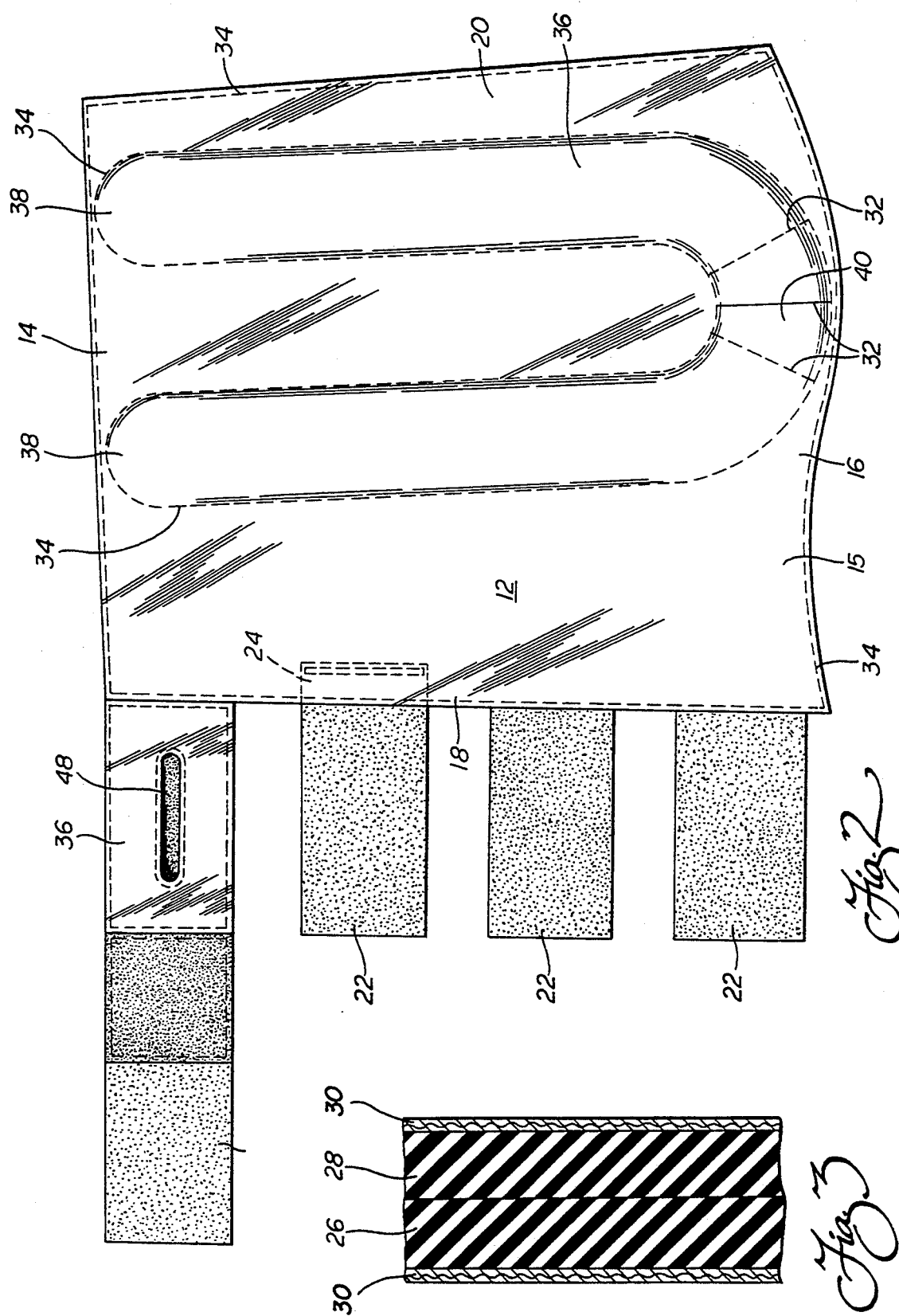

EQUINE ATHLETIC BOOT WITH INFLATABLE U-SHAPED BLADDER

TECHNICAL FIELD

The present invention relates generally to the field of equine athletic leg supports and more particularly to an athletic boot with pneumatic means for improved support and protection of the digital flexor tendons and fetlock.

BACKGROUND OF THE INVENTION

The protection of a horse's leg from injury is extremely important. As one can easily understand, the horse's leg is subject to a variety of dangers which include but are not limited to, repetitive shock loads associated with normal movement, the impact of a polo mallet, "run down" caused when the pastern over extends thereby dropping the fetlock into contact with the ground, and wind puffs caused by bulges of collected fluid within the leg.

Trainers and layman alike use many methods to reduce or prevent the foregoing injuries, the most common of which are athletic-wraps and boots. Wraps have the advantage of providing a custom fit because the person who applies the wrap has control of the tightness of the wrap during application on a per revolution basis. In this way support can be placed where each particular horse is most in need and it is easy to compensate for the various leg sizes of different horses. Wraps do, however, have great disadvantages in that they have little if any shock absorbing characteristics. Other disadvantages include the tendency to work loose. If a horse should step on the loose end and trip, causing a fall, a severe injury to both horse and/or rider may result.

Boots on the other hand have the advantage of being easily applied, and also have superior shock absorbing properties due to their construction. Typically boots are constructed of neoprene, vinyl plastisol, and/or a closed cell foam providing resiliency and cushioning. In addition, because of its superior fastening means, a boot is far less likely to come loose. Further, in the unlikely event it does work loose, the boot simply drops away without injuring either horse or rider.

Boots also have some very real disadvantages. Perhaps the most severe problem to date is the inability of boots of prior art design to effectively provide a uniform pressure around the full circumference of the horse's leg. More specifically, the lower leg of a horse includes a canon bone and two adjacent flexor tendons, the deep digital flexor and the superficial digital flexor, enclosed by a covering of skin. Due to this construction, the leg is an oblong shape with indentations on both sides between the canon bone and flexor tendons. Because of these indentations, the boot generally engages the leg at the front of the canon bone and the rear of the flexor tendons, leaving a gap on the sides. The resulting uneven pressure on the leg is less than ideal. First, such an arrangement fails to provide any effective lateral support for the flexor tendons. Second, such an arrangement may actually cause an injury by urging the flexor tendons toward the rear of the canon bone. Over time this condition may irritate and inflame the tendon leading to lameness.

One prior art method for addressing this problem is disclosed in U.S. Pat. No. 5,115,627 to Scott. The Scott patent discloses a boot including a two layer panel wherein the inner panel is of longer effective length than the outer panel. When wrapped tightly around the leg of a horse the "extra" inner panel material bunches, supporting the front of the flexor tendons by filling in the gaps between the canon bone and flexor tendons.

In practice, however, this method has proved unsatisfactory. Although the bunched material aligns within the gaps or indentations, the same amount of bunched material is forced into the indentations along the full length of the boot without regard to the natural contours of the horse's leg. Thus, an uneven application of pressure results. In addition, there is no method of increasing or decreasing the force exerted by the bunched material. Thus, the end result is still a boot that furnishes an unequal pressure distribution along and around the leg and a boot wherein the overall pressure characteristics are not effectively adjustable for a customized application. No other prior art reference provides a solution to these problems.

Thus, a need is identified for an athletic boot which fully supports the horse's leg. This new boot should include a support structure which fully compensates for any natural contours of the horse's leg, thus providing substantially uniform pressure around the full circumference of the horse's leg. This new boot should also allow the overall pressure applied to be fully adjustable to meet the needs of the horse for leg support.

SUMMARY OF THE INVENTION

Accordingly, it is a primary object of this invention to provide a new and improved equine athletic boot that overcomes the prior art difficulties in fully and uniformly supporting the leg of a horse.

Still another object of the invention is to provide an athletic boot that is pressure adjustable to effectively provide a customized fit without having to individually customize each boot on a per leg basis.

Another object of the invention is to provide a superior means of protecting the seismoid bones from trauma associated with blows or concussion to the fetlock area.

It is another object of this invention to provide an athletic boot, containing a tubular bladder, which when inflated fills in the gaps or indentations between the canon bone and flexor tendons thereby providing substantially equal pressure around the entire circumference of the leg of a horse.

Additional objects, advantages, and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, the preferred equine athletic boot includes a shock absorbing elastic panel that is wrapped around the leg of a horse so as to form an athletic boot. A bladder is carried by the panel in such a way that when the panel is wrapped around the leg, the bladder is aligned with the natural indentations along the sides of the leg. These indentations are formed between the canon bone and flexor tendons. A small pump is used to inflate the bladder so as to fill the indentations thereby supporting the front sides of the flexor tendons and resulting in substantially equal pressure on the leg around the full periphery of the athletic boot.

In accordance with the preferred embodiment, the bladder is U-shaped and attaches to the boot so that when the boot is positioned upon the leg, each of the opposed legs of the U is aligned with its respective indentation. In addition, the curved portion or closed end of the U-shaped bladder that connects the two vertical legs of the U, wraps underneath the fetlock thereby cradling the fetlock and providing superior support and protection. As can easily be appreciated, the horizontal distance between the vertical portions of this U-shaped bladder must approximately align with the indentation formed by the flexor tendon and canon bone. Thus, different boot sizes with spacing between the legs of between 1.5 and 6.0 inches are contemplated in order to fit large and small legs.

Also in accordance with the preferred embodiment, the elastic panel is constructed with cutouts or darts which cause the boot to form a cup for cradling the fetlock. Thus, the boat parallels the natural curvature of the leg in its transition from the canon to the pastern. The curved portion of the U-shaped bladder is thereby positively held underneath the fetlock by the boot. This provides superior support and protection of the seismoid bones within the fetlock Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention, and together with the description serves to explain the principles of the invention. In the drawing:

FIG. 1 is a side elevational view of a preferred embodiment of the athletic boot attached to the leg of a horse and particularly showing the alignment of the U-shaped bladder upon the leg;

FIG. 2 is a plan view of the panel of the athletic boot as seen when unwrapped and laid flat particularly showing the orientation of the U-shaped bladder and the contour of the lower or bottom edge;

FIG. 3 is an illustration of the two layers forming the panel of the boot, including the nylon loop covering on the interior and exterior surfaces of the panel;

FIG. 4 is a longitudinal cross sectional view of the boot otherwise corresponding to FIG. 1 showing the lower end of the U-shaped bladder and the manner in which it supports and protects the fetlock;

FIG. 5 is a transverse cross-sectional view through the canon bone, flexor tendons and boot showing the upright legs of the bladder in alignment and within the indentations formed between the canon bone and flexor tendons; and FIG. 6 is a fragmentary elevational view of the upper end of the boot showing the inflation pump and extension strap for access to the pump.

Reference will now be made in detail to the present preferred embodiment of the invention, an example of which is illustrated in the accompanying drawings.

DETAILED DESCRIPTION OF THE PREFERRED EMBODIMENT

Reference is now made to FIG. 1 showing an exemplary embodiment of the equine athletic boot 10 of the present invention. The boot 10 includes a panel 12 wrapped around the leg L of a horse. When properly positioned, the boot 10 extends from just below to about 9 inches above the fetlock F.

As can be seen from FIG. 2, the panel 12 is substantially rectangular in configuration and has an upper end or edge 14, a lower end or edge 16 and opposed lateral ends or edges including a fastening side 18, and an attachment side 20. Fastening members 22, in the form of hook strips have a fixed end 24 attached by stitching to the fastening side 18 of panel 12. When the panel 12 is wrapped around the leg L to form boot 10, this fastening side 18 overlaps the attachment side 20.

As shown in FIG. 3, the panel 12 of boot 10 includes in close contact, two layers 26, 28 of shock absorbing material. Each layer has approximately the same length and width dimensions and may, for example be made of neoprene. In the preferred embodiment, the interior layer 26 is made from ⅛ inch thick neoprene and the exterior layer 28 is made from 3/16 inch thick neoprene. In addition, each layer 26, 28 has one surface covered by a nylon, loop-bearing material 30. When the panel 12 is wrapped around the leg L of the horse, the nylon loop material 30 fixed to the interior neoprene layer 26 contacts the leg L of the horse. This provides a relatively friction free surface to prevent abrasion due to small shifts in the position of the boot 10 on the leg L as the horse moves. The nylon loop material 30 of the exterior layer 28 faces outwardly, forming a cooperating loop bearing surface for engagement with hook fastening members 22.

Also illustrated in FIG. 2 are three cut outs or darts 32 at the lower end 16 of panel 12. When the panel 12 is wrapped around the leg L of the horse, the darts 32 cause the boot to "cup" and thereby angle forward from the fetlock F at about the same angle as the pastern P thus providing a snug fit. In addition to these darts 32, the boot 10 provides a superior fit due to the shape of panel 12. More specifically, the lower edge 16 is contoured so as to provide a gradual rise of substantially 1.0–1.5 inches at the lateral edges 18,20. In this way, the boot 10 better conforms to the contour of the leg L when positioned as shown in drawing FIGS. 1. As a result, the boot 10 fits higher at the front of the leg L and lower at the rear, thereby fully protecting the fetlock F without inhibiting the forward motion of the pastern P. This significantly increases the horse's comfort and aids in resisting chafing.

FIG. 2, also shows the stitches 34 that hold the interior layer 26 and exterior layer 28 in close contact. These stitches 34 also hold in position a tubular bladder 36 that is disposed between the interior layer 26 and the exterior layer 28. In the preferred embodiment, this tubular bladder 36 is U-shaped, upwardly orientated, and has a right and left vertical leg portion 38 forming an open end, and a bottom curved portion 40 forming a closed end. The right and left vertical legs 38 may be spaced between 1.5 and 6.0 inches apart so as to meet the size of horse's leg and bring each leg portion 38 into correspondence with each indentation I when the boot is positioned for use. The legs 38 extend to close proximity to the upper end 14, and the bottom curved portion 40 is disposed in close proximity with the lower end 16 of panel 12. An inflating means 42, in the form of a bulb pump, is held on the outside of the boot 10. This pump 42 is connected to the tubular bladder 36 near the end of the vertical portion 38 nearest the attachment side 20 (See FIG. 6).

As should be appreciated from further viewing of FIG. 6, the upper fastening member 22 includes an extension portion 44 that extends over the pump 42 to protect the pump and air pressure relief valve 46 from inadvertent engagement when in use on the leg. More specifically, the extension portion 44 includes a port 48 through which the bulb pump 42 and pressure relief valve 46 may be selectively actuated. A cover flap 50, having a proximal end stitched to the upper fastening member 22 may be fastened to the extension portion 44 by hook and loop fastener to close the port 48 once the desired pressure adjustments are made.

FIG. 1 shows the panel 12, wrapped around the leg L of the horse to form a boot 10. Initially the panel 12 is positioned so that the "cup" formed by the darts 32 receives the fetlock F. The lateral edges 18, 20 of the panel 12 are then wrapped forward around the leg so that the fastening side 18 overlaps/overlies the attachment side 20. The hook fastening members 22 are then pulled tightly across the panel and engaged with the cooperating loop material 30 carried on the exterior face of the boot 10.

Next, the cover flap 50 is opened and the pump 42 manipulated through the port 48 to pump air into and thereby increase the pressure in the bladder 36. As this is done, the bladder 36 fills, expanding the legs 38 to a cross-sectional diameter of between 0.3 to 1.5 inches as desired to fill the indentations I defined on the leg L between the canon bone C and the flexor tendons T (see FIG. 5). Through utilization of the pump 42, the overall pressure provided around the leg L may be adjusted as desired. Lateral support is provided to the flexor tendons T and substantially even pressure is provided around the full circumference of the leg. Hence, protection to the leg is maximized and any risk of injury is substantially reduced.

As best shown in FIG. 4, the curved portion 40 or closed end of the bladder 36 fits underneath and effectively cradles the fetlock F providing both support and protection to the fetlock F and seismoids S. The secure positioning of the curved portion 40 underneath the fetlock F is insured by the darts 32 that also angle the panel 12 of the boot 10 around and underneath the fetlock F where the neoprene material may provide excellent shock absorption to reduce the risk of "run down" injuries.

After inflating the bladder 36 to the desired pressure, the cover flap 50 is closed by folding over the port 48 and engaging the extension portion 44 to secure the flap in position.

In summary, numerous benefits result from employing an equine athletic boot 10 of the disclosed design. The boot 10 is lightweight and comfortable. It is contoured and cupped to conform to the leg of the horse so as not to restrict movement or cause chafing during movement. The boot 10 also includes a novel U-shaped bladder 36 that may be inflated to provide a desired pressure to the indentations I between the canon bone C and flexor tendons T. Accordingly, the tendons T are supported at the front sides for lateral stability and maximum protection from engagement with the canon bone C even when the horse stops and/or turns quickly. Additionally, a substantially even pressure is provided around the full circumference of the leg L for added protection against injury.

The foregoing description of a preferred embodiment of the invention has been presented for purposes of illustration and description. It is not intended to be exhaustive or to limit the invention to the precise form disclosed. Obvious modifications or variations are possible in light of the above teachings. For example the gap filling property of the U-shaped tubular bladder could be duplicated by two, separate vertical bladders inflated by one or more inflating means. Another example would be to fill the tubular bladder with some kind of liquid instead of air.

This embodiment was chosen and described to provide the best application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. An equine athletic boot for support and protection of a leg of a horse in the area of the pastern, fetlock, and canon bone, comprising:
    a panel of shock absorbing material, for wrapping around the leg of the horse, having a lower end for positioning adjacent the pastern and an upper end for positioning above the fetlock;
    a means for fastening said panel to the leg of the horse;
    a tubular U-shaped bladder carried by said panel; and
    a means for inflating said tubular bladder to a selected pressure;
    whereby said boot is worn upon the leg of the horse, and said tubular bladder is inflated, providing substantially uniform pressure around the full circumference of the leg, thus reducing the risk of injury.

2. The athletic boot of claim 1 wherein said tubular U-shaped bladder includes an open end orientated toward said upper end of said panel and a closed end orientated toward said lower end of said panel.

3. The athletic boot of claim 2, wherein said U-shaped bladder includes two substantially parallel legs defining a space therebetween at said open end of substantially 1.5–6.0 inches.

4. The athletic boot of claim 2 wherein said U-shaped tubular bladder extends substantially the entire length of the boot from said lower end to said upper end.

5. The athletic boot of claim 1 wherein said inflating means is covered by an extension of a top member of said fastening means thereby preventing said inflating means from becoming inadvertently engaged, and said tubular bladder from accidentally deflating.

6. The athletic boot of claim 1 wherein said tubular bladder is substantially 0.3 to 1.5 inches in diameter when inflated.

7. The athletic boot of claim 1 wherein said panel is approximately ½ to 2 feet in length from said upper end to said lower end.

8. The athletic boot of claim 1 wherein said fastening means is a plurality of hook fastening members and said panel is substantially covered with unbroken loop polyester knit material for connection with said fastening members.

9. The athletic boot of claim 1 wherein said panel is constructed of 2 layers of neoprene rubber and said tubular bladder is disposed therebetween.

10. The athletic boot of claim 9 wherein said tubular bladder is held in place between said two layers of neoprene by nylon thread connecting said two layers within close proximity of said bladder.

11. An equine athletic boot for support and protection of a leg of a horse in the area of the pastern, fetlock, and canon bone comprising:
   a panel of shock absorbing material, for wrapping around the leg of the horse, having a lower end for positioning adjacent the pastern and an upper end for positioning above the fetlock;
   a means for fastening said panel to the leg of the horse;
   a vertically oriented tubular bladder carried by said panel wherein said bladder is U-shaped having an open end oriented toward said upper end of said panel, and a closed end orientated toward said lower end of said panel, said bladder having a cross-sectional diameter of substantially 0.3 to 1.5 inches when inflated and said U-shaped bladder includes two substantially parallel legs defining a space therebetween at said open end of substantially 1.5–6.0 inches; and
   a means to inflate said tubular bladder;
   whereby said panel is wrapped around the leg of a horse, fastened by said fastening means, and said tubular bladder is inflated to provide substantially uniform pressure around the full circumference of the leg, thereby providing support and reducing the risk of injury.

12. The athletic boot of claim 11 wherein said panel is less than 2 feet in length from said lower end to said upper end and said U-shaped bladder extends substantially the entire length of said panel.

13. The athletic boot of claim 11, wherein said panel is constructed from neoprene.

14. The athletic boot of claim 13 wherein said fastening means is a plurality of hook fastening members and an exterior surface of said panel is covered with polyester open knit material for connection with said fastening members.

15. The athletic boot of claim 11 wherein said panel is constructed of 2 layers of neoprene rubber and said tubular bladder is disposed therebetween.

16. The athletic boot of claim 11 wherein said panel includes opposed lateral edges and a lower edge extending therebetween contoured so as to provide a rise of substantially between 1.0 and 1.5 inches adjacent said lateral edges.

17. The athletic boot of claim 11 wherein at least one dart is provided in said panel adjacent the closed end of said U-shaped bladder to form a cup supporting the fetlock when the boot is positioned upon the leg of the horse.

18. An equine athletic boot for support and protection of a leg of a horse in the area of the pastern, fetlock, and canon bone, comprising:
   a panel of shock absorbing material, for wrapping around the leg of the horse, having a lower end for positioning adjacent the pastern and an upper end for positioning above the fetlock and further having lateral edges;
   a means for fastening said panel to the leg of the horse;
   a tubular bladder carried by said panel;
   a means for inflating said tubular bladder to a selected pressure; and
   a means of covering said inflating means to prevent said inflating means from becoming inadvertently engaged, and said tubular bladder from accidentally deflating, said covering means being attached to or adjacent to at least one lateral edge of said panel;
   whereby said boot is worn upon the leg of the horse, and said tubular bladder is inflated, providing substantially uniform pressure around the full circumference of the leg, thus reducing the risk of injury.

19. The athletic boot of claim 18 wherein said covering means is an extension of a top member of said fastening means.

* * * * *